United States Patent
Li et al.

(10) Patent No.: US 11,078,423 B2
(45) Date of Patent: Aug. 3, 2021

(54) LIQUID CRYSTAL DISPLAY DEVICE

(71) Applicant: Shijiazhuang Chengzhi Yonghua Display Material Co., ltd., Hebei (CN)

(72) Inventors: Jiaming Li, Hebei (CN); Zhian Liang, Hebei (CN); Guoliang Yun, Hebei (CN); Sumin Kang, Hebei (CN); Xuan Zhang, Hebei (CN)

(73) Assignee: Shijiazhuang Chengzhi Yonghua Display Material Co., Ltd., Hebei (CN)

( * ) Notice: Subject to any disclaimer, the term of this patent is extended or adjusted under 35 U.S.C. 154(b) by 72 days.

(21) Appl. No.: 16/405,315

(22) Filed: May 7, 2019

(65) Prior Publication Data

US 2020/0157429 A1 May 21, 2020

(30) Foreign Application Priority Data

Nov. 20, 2018 (CN) .......................... 201811379578.7

(51) Int. Cl.
| | | |
|---|---|---|
| *G02F 1/1333* | (2006.01) | |
| *C09K 19/56* | (2006.01) | |
| *C09K 19/12* | (2006.01) | |
| *C09K 19/30* | (2006.01) | |
| *C09K 19/34* | (2006.01) | |
| *C09K 19/44* | (2006.01) | |
| *C09K 19/04* | (2006.01) | |

(52) U.S. Cl.
CPC .............. *C09K 19/56* (2013.01); *C09K 19/12* (2013.01); *C09K 19/3003* (2013.01); *C09K 19/3028* (2013.01); *C09K 19/3066* (2013.01); *C09K 19/3098* (2013.01); *C09K 19/3402* (2013.01); *C09K 19/3491* (2013.01); *C09K 19/44* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01); *C09K 2019/3025* (2013.01); *C09K 2019/3036* (2013.01); *C09K 2019/3422* (2013.01)

(58) Field of Classification Search
CPC .... C09K 19/56; C09K 19/12; C09K 19/3003; C09K 19/3028; C09K 19/3066; C09K 19/3098; C09K 19/3402; C09K 19/3491; C09K 19/44; C09K 2019/0448; C09K 2019/122; C09K 2019/123; C09K 2019/3004; C09K 2019/3009; C09K 2019/301; C09K 2019/3016; C09K 2019/3021; C09K 2019/3025; C09K 2019/3036; C09K 2019/3422; G02F 1/1333
USPC ...................................... 252/299.4
See application file for complete search history.

(56) References Cited

U.S. PATENT DOCUMENTS 9,389,462 B2 * 7/2016 Takeuchi ........... C09K 19/3066
2020/0157429 A1 * 5/2020 Li ...................... C09K 19/3098

* cited by examiner

*Primary Examiner* — Geraldina Visconti
(74) *Attorney, Agent, or Firm* — Muncy, Geissler, Olds & Lowe, P.C.

(57) ABSTRACT

The present invention relates to a liquid crystal display device. The liquid crystal display device of the present invention comprises a first substrate, a second substrate, and a liquid crystal composition disposed between said first substrate and said second substrate, wherein said first substrate and said second substrate are disposed in parallel and opposite to each other, with the distance between said first substrate and said second substrate being 2.5 μm to 3.2 μm; alignment layers are disposed on the sides of said first and second substrates that are close to said liquid crystal composition; and said alignment layers are provided with vertical alignment films that allow liquid crystal molecules in said liquid crystal composition to be arranged roughly perpendicular to said first or second substrate.

10 Claims, 1 Drawing Sheet

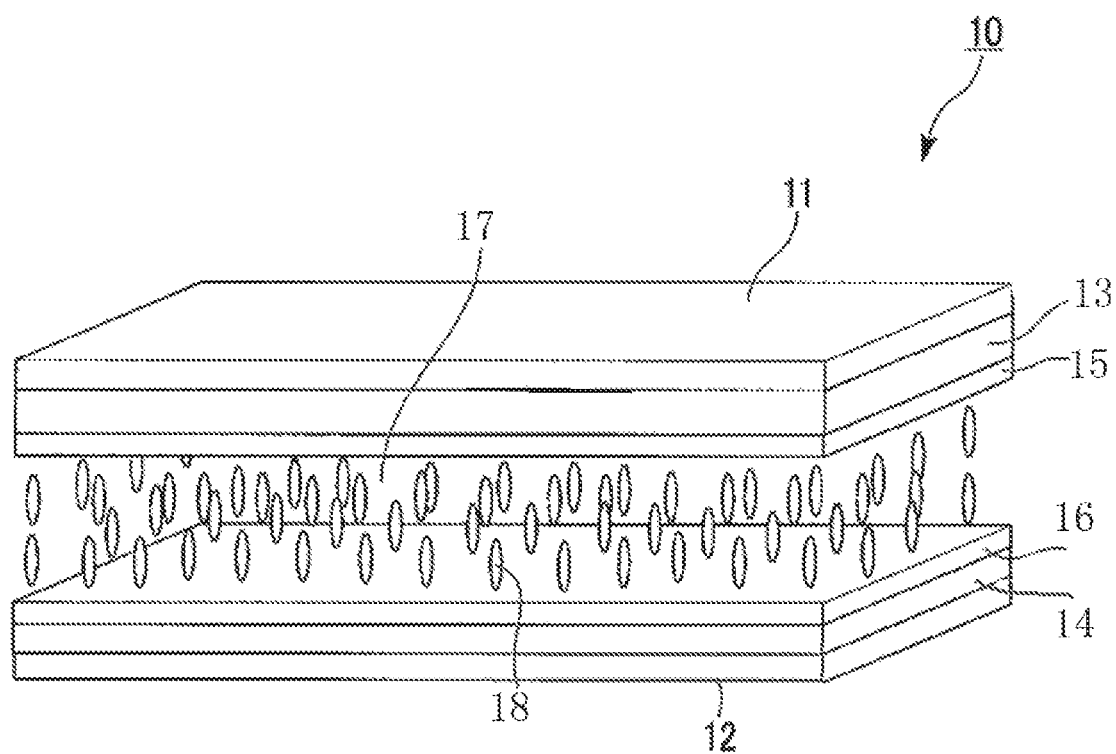

LIQUID CRYSTAL DISPLAY DEVICE

TECHNICAL FIELD

The present invention relates to the technical field of liquid crystal displays. More particularly, the invention relates to a liquid crystal display device.

BACKGROUND ART

With the development of display technologies, flat panel display devices such as liquid crystal display (LCD) devices are widely used in various consumer electronics such as mobile phones, televisions, personal digital assistants, digital cameras, notebook computers, desktop computers due to having the advantages of high image qualities, power saving, thin bodies, a wide range of applications, etc., and have become the mainstream in display devices.

In a liquid crystal display device of a PSVA (Polmer Stabilized Vertivally Aligned) display mode, a liquid crystal layer contains a polymerizable compound acting as a reactive mesogen (RM), wherein by means of the polymerization of the RM, liquid crystal molecules are given a certain pretilt angle, such that a vertical alignment effect is produced; furthermore, the problem of the rubbing of the alignment layers causing dust particles, electrostatic residue, rubbing marks, etc., which result in a reduced liquid crystal display device yield, can be avoided. However, due to the characteristics of the PSVA display mode, the response speed thereof is slow, and therefore, how to improve the response speed of a PSVA liquid crystal display device is an urgent problem to be solved.

SUMMARY OF THE INVENTION

In order to obtain a liquid crystal display device having a fast response speed, the inventors of the present application have conducted intensive studies and found that this object can be achieved by means of the liquid crystal display device of the present invention, thereby completing the present invention.

An object of the present invention is to provide a liquid crystal display device having an improved response speed.

The liquid crystal display device of the present invention comprises a first substrate, a second substrate, and a liquid crystal composition disposed between said first substrate and said second substrate, wherein said first substrate and said second substrate are disposed in parallel and opposite to each other, with the distance between said first substrate and said second substrate being 2.5 µm to 3.2 µm; alignment layers are disposed on the sides of said first and second substrates that are close to said liquid crystal composition; said alignment layers are provided with vertical alignment films that allow liquid crystal molecules in said liquid crystal composition to be arranged roughly perpendicular to said first or second substrate; and said liquid crystal composition comprises one or more compounds represented by formula I and one or more compounds represented by formula II:

I

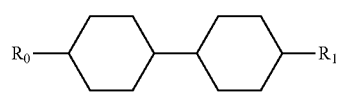

-continued

II

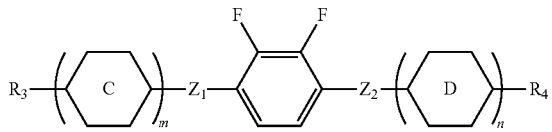

wherein $R_0$ represents an alkyl group having a carbon atom number of 1-10, an alkoxy group having a carbon atom number of 1-10, an alkenyl group having a carbon atom number of 2-10, or an alkenoxy group having a carbon atom number of 3-8, and $R_1$ represents an alkenyl group having a carbon atom number of 2-10; and wherein $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —$CH_2$— in the groups represented by $R_3$ and $R_4$ are each independently optionally substituted with cyclopentylene, cyclobutylene or cyclopropylene;

$Z_1$ and $Z_2$ each independently represent a single bond, —$CH_2CH_2$— or —$CH_2O$—;

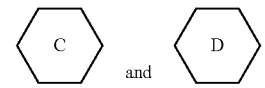

each independently represent 1,4-phenylene, 1,4-cyclohexylene, fluorinated 1,4-phenylene or 1,4-cyclohexenylene;

m represents 1 or 2; and n represents 0, 1 or 2.

The liquid crystal display device provided by the present invention has the characteristics of a wider nematic phase temperature range, a suitable or higher birefringence anisotropy Δn, and a high charge retention ratio, and by arranging a liquid crystal composition comprising a compound represented by formula I and a compound represented by formula II within a specific spacing between the substrates, a liquid crystal display device having an improved response speed is obtained; furthermore, a decrease in the spacing between the substrates can reduce the amount of the liquid crystal composition and effectively reduce the cost of the liquid crystal display device.

BRIEF DESCRIPTION OF THE DRAWINGS

The sole FIGURE is a structural schematic view of one embodiment of the liquid crystal display device of the present invention.

DETAILED DESCRIPTION OF EMBODIMENTS

[Liquid Crystal Display Device]

The liquid crystal display device of the present invention comprises a first substrate, a second substrate, and a liquid crystal composition disposed between said first substrate and said second substrate, wherein said first substrate and said second substrate are disposed in parallel and opposite to each other, with the distance between said first substrate and said second substrate being 2.5 μm to 3.2 μm; alignment layers are disposed on the sides of said first and second substrates that are close to said liquid crystal composition; said alignment layers are provided with vertical alignment films that allow liquid crystal molecules in said liquid crystal composition to be arranged roughly perpendicular to said first or second substrate; and said liquid crystal composition comprises one or more compounds represented by formula I and one or more compounds represented by formula II:

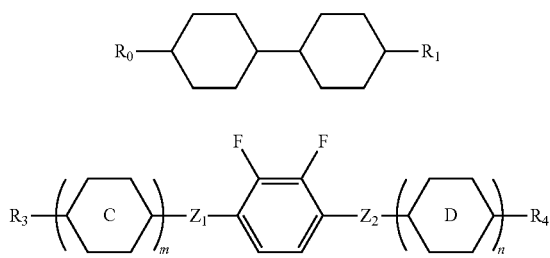

wherein $R_0$ represents an alkyl group having a carbon atom number of 1-10, an alkoxy group having a carbon atom number of 1-10, an alkenyl group having a carbon atom number of 2-10, or an alkenoxy group having a carbon atom number of 3-8, and $R_1$ represents an alkenyl group having a carbon atom number of 2-10; and wherein $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —CH$_2$— in the groups represented by $R_3$ and $R_4$ are each independently optionally substituted with cyclopentylene, cyclobutylene or cyclopropylene;

$Z_1$ and $Z_2$ each independently represent a single bond, —CH$_2$CH$_2$— or —CH$_2$O—;

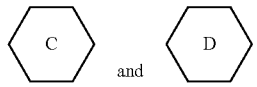

each independently represent 1,4-phenylene, 1,4-cyclohexylene, fluorinated 1,4-phenylene or 1,4-cyclohexenylene;

m represents 1 or 2; and n represents 0, 1 or 2.

In the liquid crystal display device of the present invention, the liquid crystal composition is disposed between the first substrate and the second substrate with a specific spacing; by reducing the substrate spacing, a faster response speed is achieved; furthermore, the amount of the liquid crystal composition can be reduced, and the cost of the liquid crystal display device is effectively reduced.

The above-mentioned distance between the first substrate and the second substrate refers to the height of an interlayer space formed between the first substrate and the second substrate. The above-mentioned distance between the first substrate and the second substrate may be controlled by, for example, providing spacers between the above-mentioned first and second substrates and by means of the particle diameter of the spacers. For example, by providing, for example, glass beads or plastic beads having a diameter of 2.5 μm to 3.2 μm as the spacers on the second substrate, and then bonding the first and second substrates oppositely to each other with the spacers disposed therebetween, an interlayer space height can be formed with the distance formed between the first and second substrates corresponding to the particle diameter of the spacers. It is to be noted that the control of the above-mentioned distance between the first substrate and the second substrate may also be achieved by means of embodiments known to a person skilled in the art other than by means of the spacers.

The liquid crystal display device provided by the present invention has a wider nematic phase temperature range, a suitable or higher birefringence anisotropy Δn, a high charge retention ratio, and particularly has the characteristics of a faster response speed and a low cost.

In some embodiments of the liquid crystal display device of the present invention, the above-mentioned first substrate is a color film substrate, and the above-mentioned second substrate is a thin film transistor substrate; in addition, the above-mentioned first substrate is provided with a common electrode, and the above-mentioned second substrate is provided with a pixel electrode.

The above-mentioned first substrate and the above-mentioned second substrate may be, for example, a glass substrate or a plastic substrate. The plastic substrate may be, for example, formed of a material such as an acrylic resin, a methacrylic resin, a cyclic olefin resin, etc. The common electrode and the pixel electrode are formed of a transparent material such as indium tin oxide (ITO). The pixel electrode is controlled by a thin film transistor unit on the second substrate. By applying a voltage to the electrodes on the two oppositely disposed substrates, liquid crystal molecules in the liquid crystal composition disposed between the two substrates are rotated, thereby converting an optical signal.

In the liquid crystal display device of the present invention, the above-mentioned alignment layers have a thickness of, for example, 30 nm to 120 nm, preferably 40 nm to 60 nm. The alignment layers are formed of, for example, a polyimide, a polyamide, a polysiloxane etc., in which the polyimide is preferred. In another aspect, in the case of using a polysilane-based alignment layer, a siloxane-dissolving polysiloxane solution may be used. In the liquid crystal display device of the present invention, in order to prevent a decreased liquid crystal display device yield caused by dust particles, electrostatic residue, etc. generated during the process of the rubbing of the alignment layers, neither of the alignment layers undergoes a rubbing process; instead, the liquid crystal molecules in the liquid crystal composition are aligned by means of the vertical alignment films disposed between the alignment layers and the liquid crystal composition. In the present invention, the arrangement of the liquid crystal molecules in the liquid crystal composition being roughly perpendicular to the first and second substrates means that the included angle formed between the liquid crystal molecules in the liquid crystal composition and the planes of the first and second substrates is close to 90°, which angle is also referred to as the pretilt angle of the liquid crystal molecules. The above-mentioned pretilt angle of the liquid crystal molecules refers to an angle formed between the liquid crystal molecules with respect to the plane of the first or second substrate under the condition of no voltage being applied to the liquid crystal display device, and the angle is set to, for example, 88.5° to 89.5°. By means of the vertical alignment films and the liquid crystal composition that cooperate with each other, the liquid crystal molecules are given a suitable pretilt angle, thereby obtaining a liquid crystal display device with a significantly improved contrast ratio on the basis of maintaining a response time as short as possible.

In the liquid crystal display device of the present invention, from the perspective of obtaining a faster response speed, the distance between said first substrate and said second substrate is 3.2 μm or less, and further preferably 3.0 μm or less, whereby the effect of a reduced liquid crystal composition amount to reduce costs can be further achieved. Where the distance between the first substrate and the second substrate is less than 2.5 μm, the difficulty in the process of preparing the liquid crystal display device is increased, and the manufacturing cost is increased, so the distance between the first substrate and the second substrate is preferably 2.5 μm or more. In order to further balance the response speed and the manufacturing cost of the liquid crystal display device, the distance between the first substrate and the second substrate is further preferably 2.6 μm or more.

[Vertical Alignment Film]

In the liquid crystal display device of the present invention, the above-mentioned vertical alignment films are, for example, thin films formed by polymerizing a polymerizable compound having a polymerizable group.

The above-mentioned polymerizable compound may be selected, for example, from one or more compounds of formula IV:

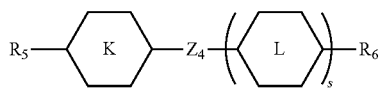
IV wherein $R_5$ and $R_6$ each independently represent $P_3$—$Sp_3$-, H, Cl, F, or an alkyl having a carbon atom number of 1-12; one or more non-neighboring —$CH_2$— groups in said alkyl having a carbon atom number of 1-12 is optionally replaced by —O—, —$CH_2$=$CH_2$—, —CO—, —OCO— or —COO—; wherein at least one of $R_5$ and $R_6$ represents $P_3$—$Sp_3$-;

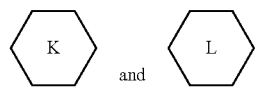

each independently represent phenylene, a phenylene group optionally substituted with $P_3$—$Sp_3$-, Cl, F, an alkyl having a carbon atom number of 1-12 or an alkoxy group having a carbon atom number of 1-12, or indanyl, wherein one or two non-neighboring —$CH_2$— groups in said alkyl having a carbon atom number of 1-12 and said alkoxy group having a carbon atom number of 1-12 are optionally replaced by —O—, —$CH_2$=$CH_2$—, —CO—, —OCO— or —COO—, furthermore,

is bonded to $R_5$ at any position of

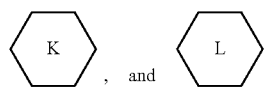

is bonded to $R_6$ at any position of

s represents 0, 1 or 2;
$P_3$ represents a polymerizable group; $Sp_a$ represents a spacer group; and
$Z_4$ represents a single bond, —COO—, —$CH_2$O— or —$CH_2CH_2$—.

The compound represented by formula IV may be a polymerizable compound and functions as a reactive mesogen (RM), and specific examples of the compound represented by formula IV include, for example, one of or a combination of some of an acrylate, an acrylate derivative, a methacrylate, a methacrylate derivative, styrene, a styrene derivative, and an epoxy resin. The compound represented by formula IV is capable of polymerizing or cross-linking polymerizable groups at both ends by absorbing light energy to form a vertical alignment film having protrusions on the alignment layer, thereby providing a sustained and stable pretilt angle for the liquid crystal molecules.

Optionally, the above-mentioned polymerizable compound is selected from the group consisting of compounds represented by the formulas IV1 to IV8:

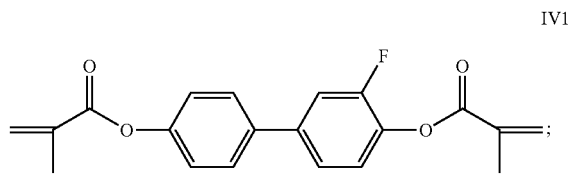
IV1

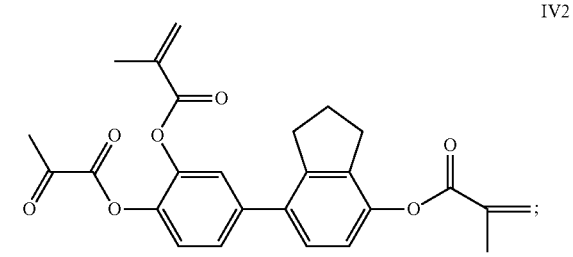
IV2

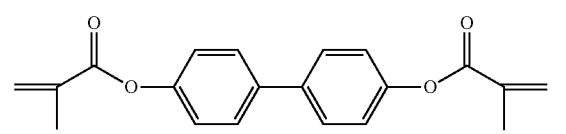
IV3

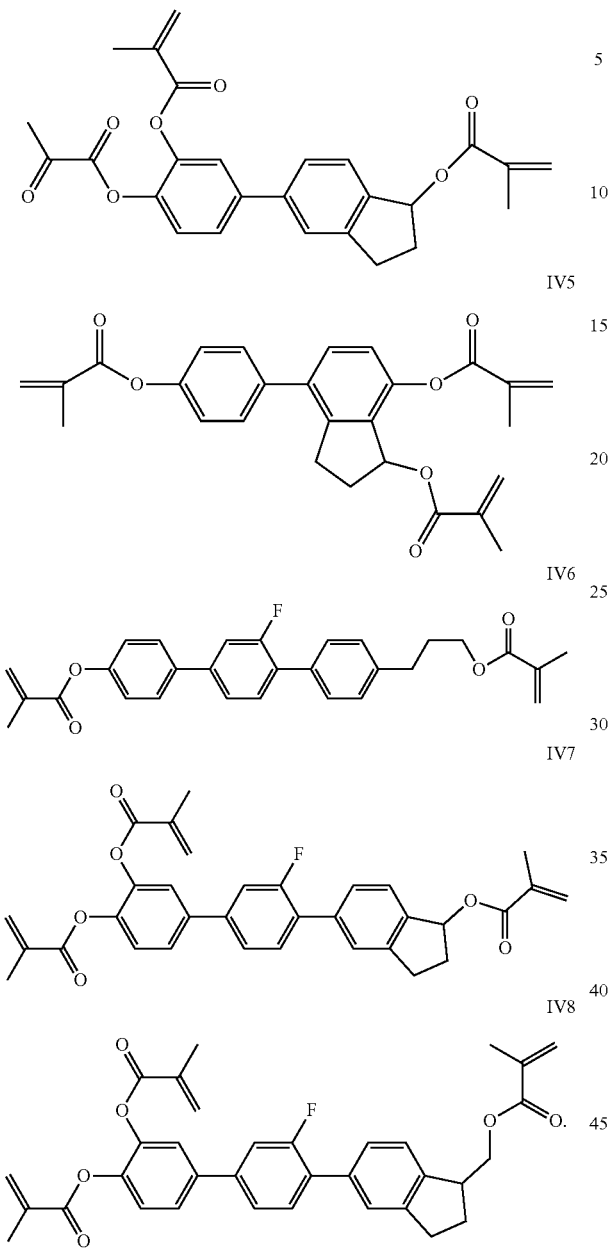

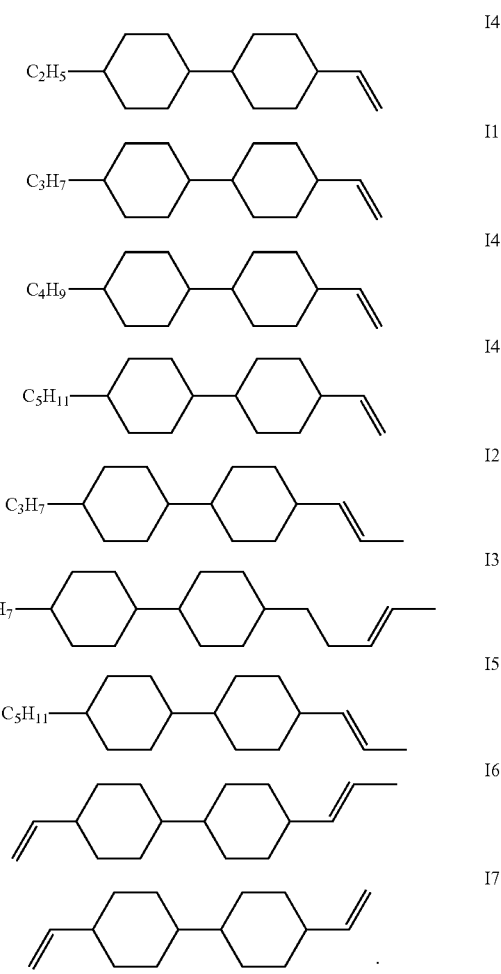

On the basis that the mass of the liquid crystal composition excluding the polymerizable compound represented by formula IV is 100%, the mass percentage content of the polymerizable compound represented by formula IV is 0.01%-1%, preferably 0.03%-0.5%. From the viewpoint of not causing defective displaying with afterimage in the liquid crystal display device, the content of the compound represented by formula IV above is preferably 1% or less, and further preferably 0.5% or less. In addition, from the viewpoint of the polymerization of the vertical alignment film to form a polymer thin film and thus align the liquid crystal molecules, and the prevention of the alignment layers from a decreased liquid crystal display device yield caused by dust particles, electrostatic residue, etc. generated during the process of the displaying of the liquid crystal display devices, the content of the polymerizable compound represented by formula IV above is preferably 0.01% or more, and further preferably 0.03% or more.

[Liquid Crystal Composition]

In the liquid crystal composition used in the liquid crystal display device of the present invention, the compound represented by formula I above may be selected from the group consisting of the compounds represented by formulas I1 to I7:

The compound represented by formula I has the characteristics of a low rotary viscosity and a good mutual solubility with other compounds. A lower rotary viscosity is more conducive to improve the response speed of the liquid crystal composition.

In the liquid crystal display device of the present invention, the one or more compounds represented by formula II above may be selected, for example, from the group consisting of the compounds represented by formulas II1 to II14:

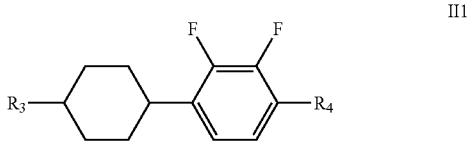

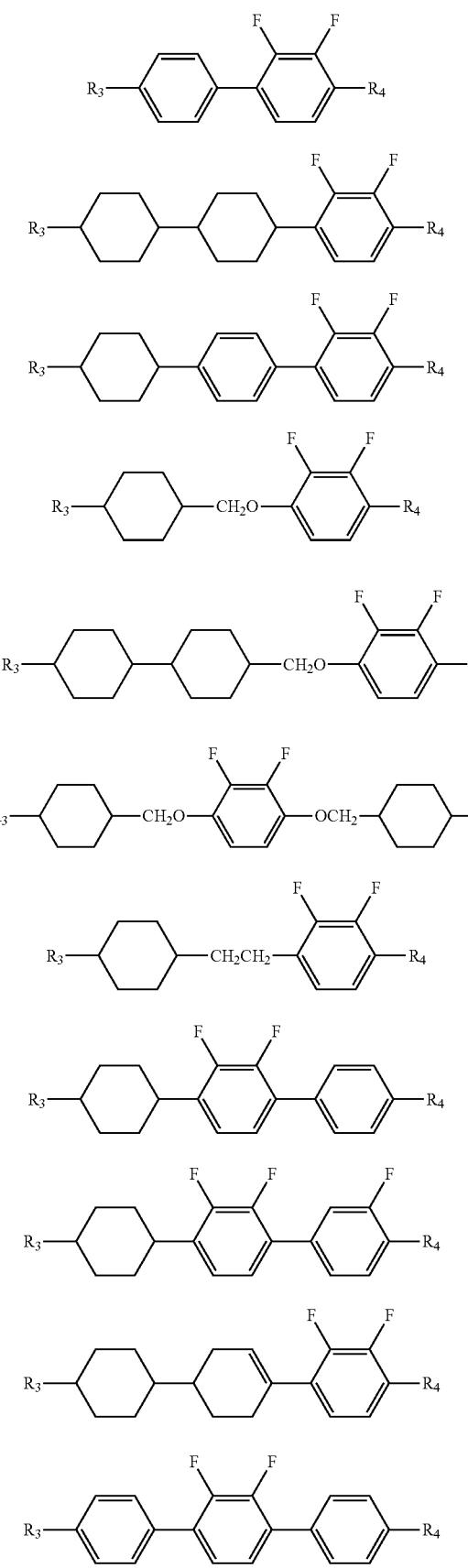

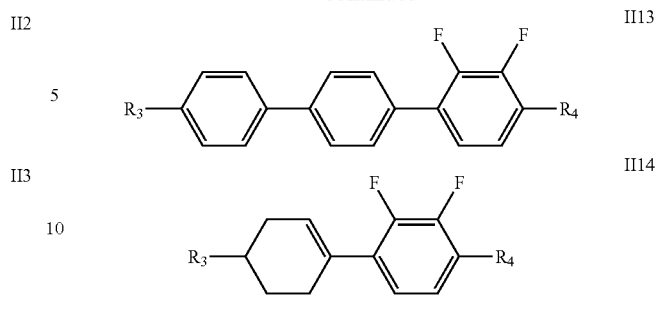

wherein $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —$CH_2$— in the groups represented by $R_3$ and $R_4$ are each independently optionally substituted with cyclopentylene, cyclobutylene or cyclopropylene.

The compound represented by formula II has a negative dielectric anisotropy, and the drive voltage of the liquid crystal composition may be adjusted by containing the compound represented by formula II in the liquid crystal composition.

Examples of the above-mentioned groups obtained by substituting one or more non-neighboring —$CH_2$— in the groups represented by in the alkyl group having a carbon atom number of 1-10 with cyclopropylene, cyclobutylene or cyclopentylene include cyclopropyl, cyclobutyl, cyclopentyl, methylcyclopropylene, ethylcyclopropylene, propylcyclopropylene, isopropylcyclopropylene, n-butylcyclopropylene, isobutylcyclopropylene, t-butylcyclopropylene, methylcyclobutylene, ethylcyclobutylene, propylcyclobutylene, iso-propylcyclobutylene, n-butylcyclobutylene, isobutylcyclobutylene, t-butylcyclobutylene, methylcyclopentylene, ethylcyclopentylene, propylcyclopentylene, isopropylcyclopentylene, n-butylcyclopentylene, isobutylcyclopentylene etc. Among the groups represented by $R_3$ and $R_4$, cyclopropyl, cyclobutyl or cyclopentyl is preferred from the viewpoint of the rotary viscosity, solubility and clearing point of the liquid crystal compound.

Optionally, the above-mentioned liquid crystal composition may be a negative dielectric anisotropic liquid crystal composition.

The percentage content of the compound represented by formula I in the total mass percentage of the liquid crystal composition is preferably 10%-40%, and further preferably 10%-30%; and the percentage content of the compound represented by formula II in the total mass percentage of the liquid crystal composition is preferably 25%-90%, and further preferably 70%-90%.

In some embodiments of the liquid crystal display device of the present invention, optionally, the above-mentioned liquid crystal composition further comprises one or more compounds represented by formula III:

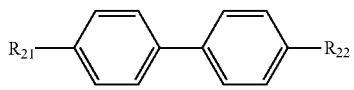

III wherein $R_{21}$ and $R_{22}$ each independently represent an alkyl group having a carbon atom number of 1-10, an alkoxy group having a carbon atom number of 1-10, an alkenyl group having a carbon atom number of 2-10, or an alkenoxy group having a carbon atom number of 3-8.

The above-mentioned one or more compounds represented by formula III may be selected from the group consisting of compounds represented by formulas III1 to III8:

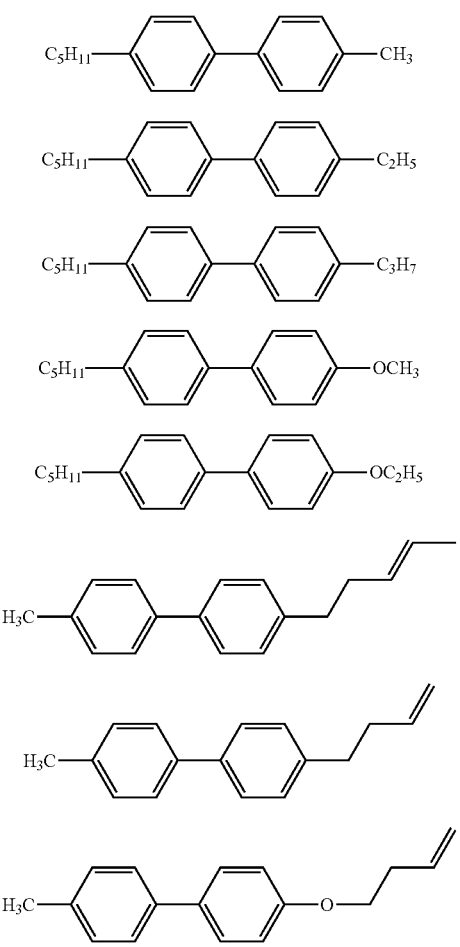

The compound represented by formula III has larger optical anisotropy, and by containing the compound represented by formula III in the liquid crystal composition of the present invention, the liquid crystal composition can be provided with different optical anisotropy parameters to obtain liquid crystal display devices with different optical retardation designs.

The mass percentage content of the total amount of the compound represented by formula III in the liquid crystal composition is preferably 5%-30%, further preferably 10%-20%.

In some embodiments of the liquid crystal display device of the present invention, optionally, the above-mentioned liquid crystal composition further comprises one or more compounds represented by formula V:

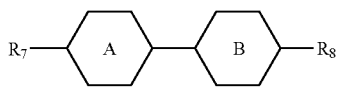

V wherein $R_7$ and $R_8$ each independently represent an alkyl group having a carbon atom number of 1-10, an alkoxy group having a carbon atom number of 1-10, an alkenyl group having a carbon atom number of 2-10, or an alkenoxy group having a carbon atom number of 3-8;

represents

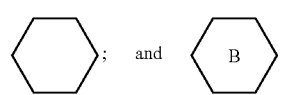

represents

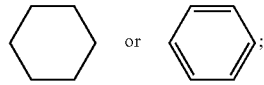 [SMILES: C1CCCCC1 ; c1ccccc1]

where

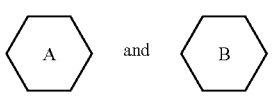

both represent

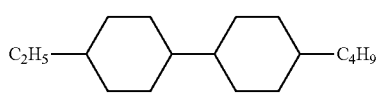, $R_8$ does not represent an alkenyl group.

The above-mentioned one or more compounds represented by formula V may be selected from the group consisting of compounds represented by formulas V1 to V14:

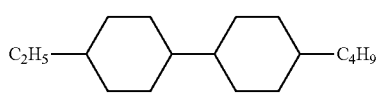

V1

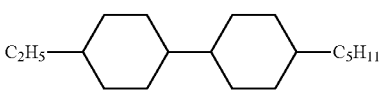

V2

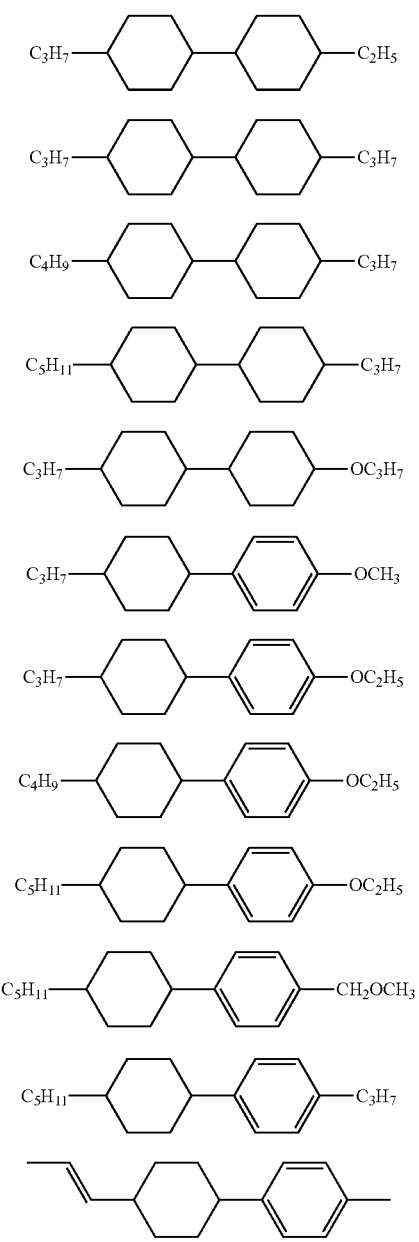

The mass percentage content of the total amount of the compound represented by formula V in the liquid crystal composition is preferably 5%-30%, further preferably 10%-20%.

In some embodiments of the liquid crystal display device of the present invention, optionally, the above-mentioned liquid crystal composition further comprises one or more compounds represented by formula VI:

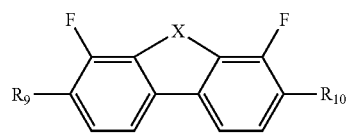

wherein $R_9$ and $R_{10}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —$CH_2$— groups in the groups represented by $R_9$ and $R_{10}$ are each independently optionally substituted with cyclopentylene, cyclobutylene or cyclopropylene; and X represents O, S or —$CH_2O$—.

Optionally, the above-mentioned one or more compounds represented by formula VI are selected from the group consisting of compounds represented by formulas VI1 to VI9:

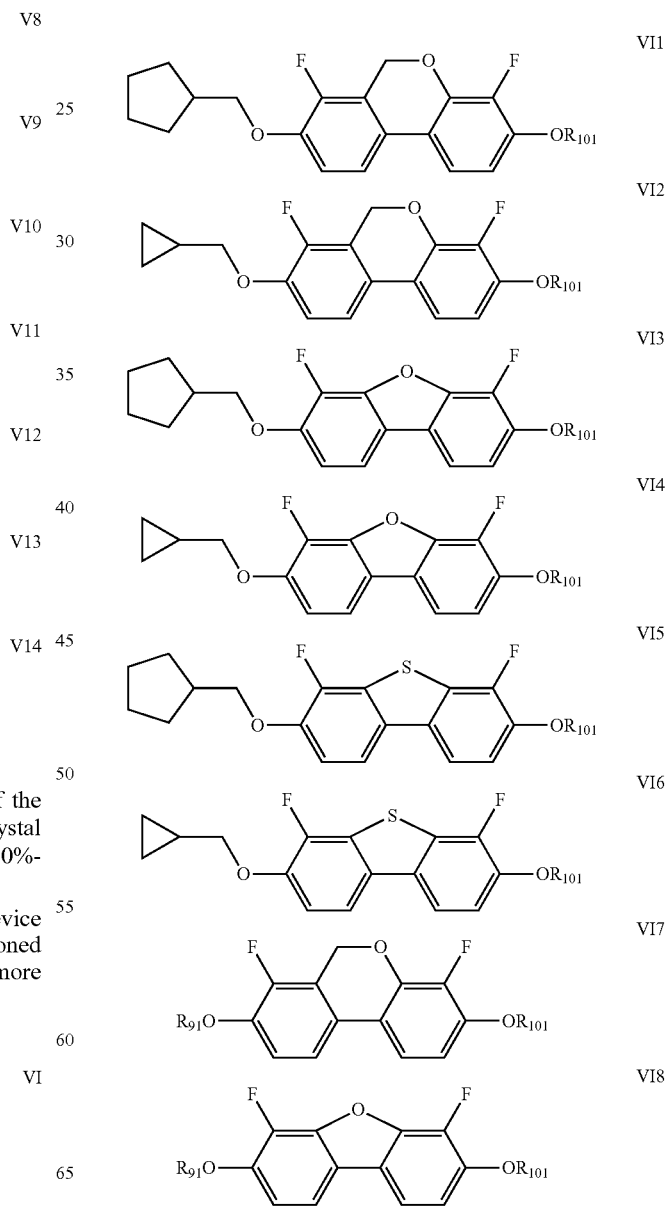

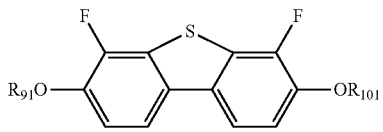

wherein $R_{91}$ and $R_{101}$ each independently represent an alkyl group having a carbon atom number of 2-6.

The above-mentioned compound represented by formula VI has a larger negative dielectric anisotropy, and by containing the above-mentioned compound represented by formula VI in the liquid crystal composition, the drive voltage of the liquid crystal display device of the present invention is advantageously lowered. The compounds of formulas VI1 to VI6 have a cyclopentyl or cyclopropyl group on one side, have a better mutual solubility with other compounds than the compounds of formulas VI7 to VI9, and are therefore more preferable.

The mass percentage content of the total amount of the above-mentioned one or more compounds represented by formula VI in the liquid crystal composition is preferably 1%-20%, further preferably 5%-10%.

In some embodiments of the liquid crystal display device of the present invention, optionally, the above-mentioned liquid crystal compounds may further comprise one or more compounds represented by formula VII:

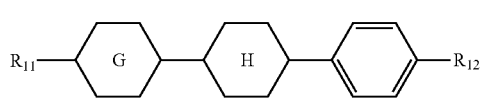

wherein $R_{11}$ and $R_{12}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —$CH_2$— groups in the groups represented by $R_{11}$ and $R_{12}$ are optionally substituted with cyclopentylene, cyclobutylene or cyclopropylene; and

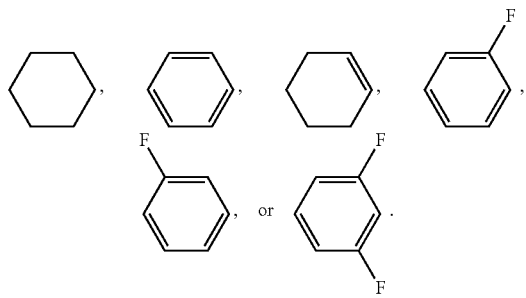

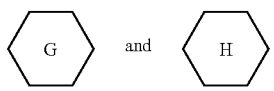

each independently represent

The above-mentioned one or more compounds represented by formula VII may be selected from the group consisting of compounds represented by formulas VII1 to VII7:

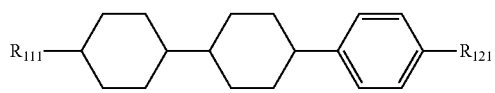

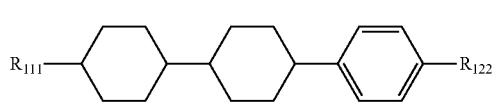

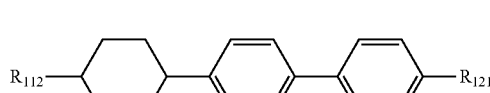

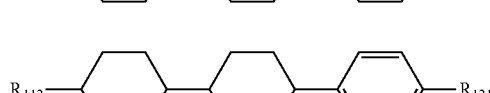

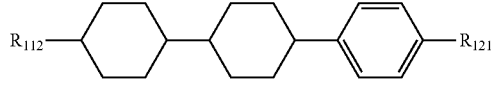

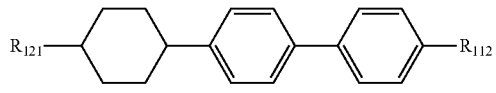

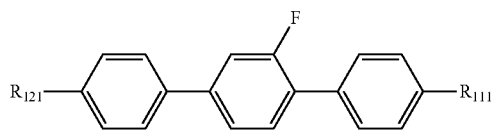

wherein $R_{121}$ represents an alkyl group having a carbon atom number of 1-6, $R_{122}$ represents an alkoxy group having a carbon atom number of 1-6, $R_{111}$ represents an alkyl group having a carbon atom number of 2-6, and $R_{112}$ represents an alkenyl group having a carbon atom number of 2-6.

Where the end chain of the above compound represented by formula VII is the alkenyl group $R_{112}$, the liquid crystal compound has a higher clearing point and elastic constant, especially flexural elastic constant $K_{33}$, and is advantageous for improving the parameter performance of the liquid crystal composition, and is therefore more preferable.

The mass percentage content of the total amount of the above-mentioned one or more compounds represented by formula VII in the liquid crystal composition is preferably 1%-30%, further preferably 5%-20%.

In some embodiments of the liquid crystal display device of the present invention, optionally, the above-mentioned liquid crystal compounds may further comprise one or more compounds represented by formula VIII:

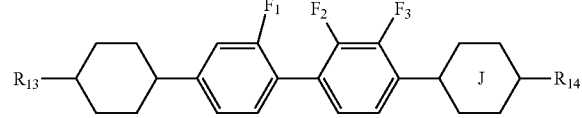

wherein $R_{13}$ and $R_{14}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8; and

represents

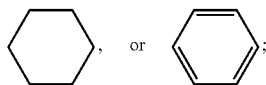

and $F_1$, $F_2$ and $F_3$ each independently represent H or F, with $F_2$ and $F_3$ not simultaneously being F.

The above-mentioned one or more compounds represented by formula VIII are preferably selected from the group consisting of compounds represented by formulas VIII1 to VIII4:

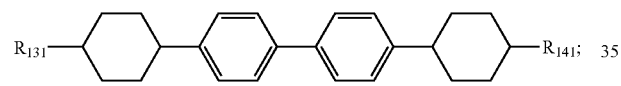
VIII1

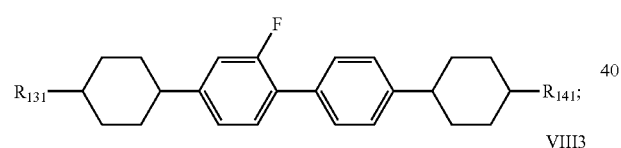
VIII2

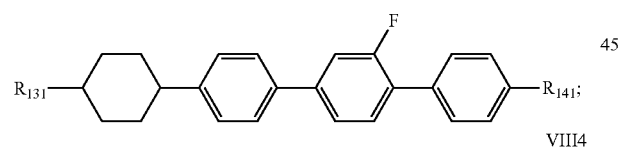
VIII3

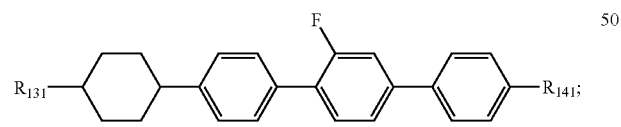
VIII4 wherein $R_{131}$ and $R_{141}$ each independently represent an alkyl group having a carbon atom number of 1-6.

The above-mentioned compounds represented by formulas VIII1 to VIII4 have a high clearing point, generally higher than 200° C., which can more significantly improve the clearing point of the liquid crystal composition used in the liquid crystal display device of the present invention.

The total mass percentage content of the above-mentioned one or more compounds represented by formula VIII is preferably 1%-10%, further preferably 2%-5%.

In some embodiments of the liquid crystal display device of the present invention, optionally, dopants with various functions may also be added to the above-mentioned liquid crystal composition; in the case of containing a dopant, the mass percentage of the content of the dopant in the liquid crystal composition is preferably between 0.01%-1%; and examples of such dopants include an antioxidant, an ultraviolet absorber, and a chiral agent.

Examples of the antioxidant and the ultraviolet absorber include:

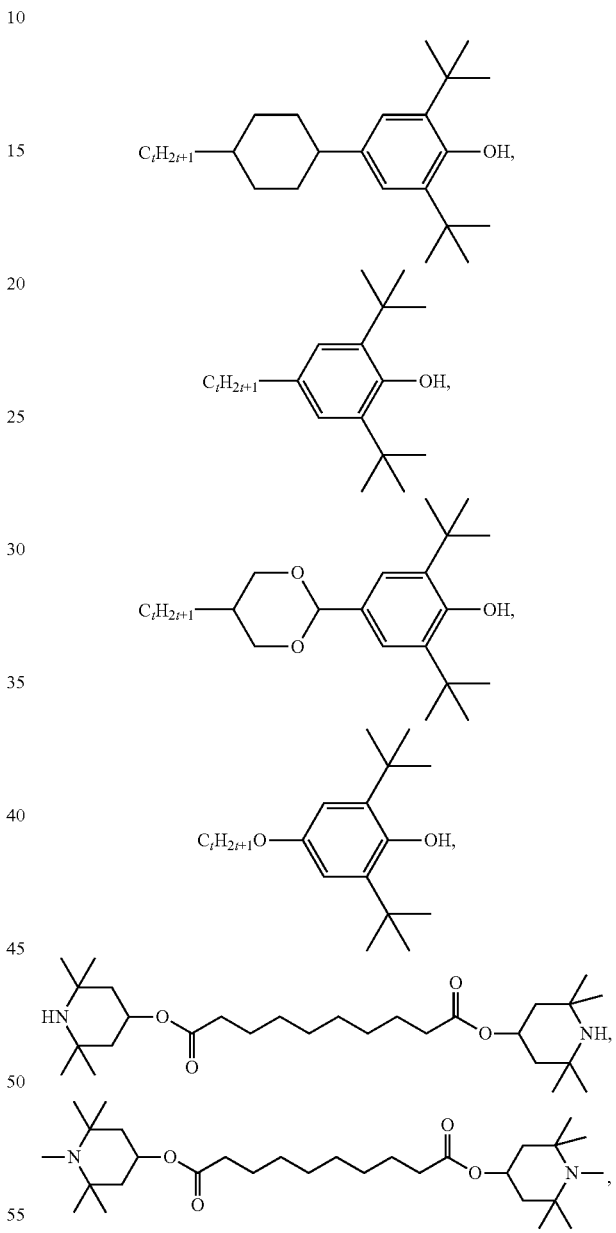

and t represents an integer of 1-10.

[Method for Manufacturing Liquid Crystal Display Element]

Next, the method for manufacturing a liquid crystal display device of the present invention is described with reference to the FIGURE.

The FIGURE is a schematic view of a liquid crystal display device of one embodiment of the present invention. As a manufacturing method therefor, the following method may be given, for example.

An alignment layer forming material is applied to a plane, on which a common electrode (not shown in the FIGURE) is formed, of a first substrate 11 and a plane, on which a pixel electrode (not shown in the FIGURE) is formed, of a second substrate 12, and cured by heating to respectively form alignment layers 13 and 14.

The constituent material of the alignment layers may be, for example, a polyimide or a polysiloxane; and in the case of the polyimide, the above-mentioned alignment layer forming material may, for example, be a mixture of a tetracarboxylic dianhydride and a diisocyanate, a polyamic acid, or a solution of a polyimide dissolved or dispersed in a solvent. In the case of the polysiloxane, the above-mentioned alignment layer forming material may, for example, be a silicon compound having an alkoxy group, a silicon compound having a halogenated alkoxy group. If necessary, a compound having photocrosslinkability, a photopolymerization initiator, a solvent, etc. may be added to the alignment layer forming material.

The alignment layers 13 and 14 are formed by means of heat curing without undergoing a rubbing process. After the alignment layers 13 and 14 are formed, spacers (not shown in the FIGURE) are spread on the surface of the alignment layer 14 of the second substrate 12, and a border adhesive is applied along the edge of the first substrate 11 and cured by heating. It is to be noted that the spacers may also be spread on the first substrate. Which substrate the spacers are spread on mainly depends on which substrate is placed in the lower layer during the device preparation process, and the spacer is generally spread on the lower substrate.

Then, the first substrate 11 and the second substrate 12 are bonded, with spacers therebetween, in a manner such that the alignment layer 13 and the alignment layer 14 face each other to form a structure having an interlayer space 17, and a liquid crystal composition and a polymerizable compound (not shown in the FIGURE) for forming vertical alignment films 15 and 16 described later are injected into the interlayer space 17 formed by the first substrate 11 and the second substrate 12. A frame is sealed by means of heating, so that the liquid crystal composition and the polymerizable compound are sealed between the first substrate 11 and the second substrate 12.

By providing spacers, which may be, for example, glass beads or plastic beads having a diameter of 2.5 μm to 3.2 μm, on the second substrate, and then bonding the first substrate 11 and the second substrate 12 oppositely to each other with the spacers disposed therebetween, an interlayer space 17 structure can be formed with the distance formed between the first substrate 11 and the second substrate 12 corresponding to the particle diameter of the spacers. In accordance with the distance between the first substrate 11 and the second substrate 12, the particle diameter of the spacers as described above is preferably 2.6 μm or more and 3.0 μm or less.

Next, a voltage is applied between the common electrode and the pixel electrode by means of a voltage applying device (not shown in the FIGURE), with the voltage being 12-20 V, and the applied electric field may be a square wave alternating electric field of, for example, a frequency of 60 Hz. During the application of the voltage, ultraviolet light irradiation is carried out, and the ultraviolet light irradiation is divided into two stages. The first stage of ultraviolet light irradiation (UV1) is carried out to polymerize the polymerizable compound to form the vertical alignment films 15 and 16, so that the liquid crystal molecules 18 in the liquid crystal composition form a pretilt angle of 88.5°-89.5°. The ultraviolet light has a wavelength of 360 nm to 370 nm, the ultraviolet light irradiation time may be 85-115 s, and the ultraviolet light irradiance is 60-72 mw/cm². After the first stage of ultraviolet light irradiation (UV1) is completed, the second stage of ultraviolet light irradiation (UV2) is carried out to slowly polymerize the polymerizable compound which is not polymerized, so that no polymerizable compound residue is present in the liquid crystal composition. The ultraviolet light in the second stage of ultraviolet light irradiation (UV2) has a wavelength of 360 nm-370 nm, the ultraviolet light irradiation time may be 100-150 min, and the ultraviolet light irradiance is 3-8 mw/cm². The use of UV2 within this range of intensity generally enables slow complete polymerization of the polymerizable compound which is not polymerized, and since the polymerization of the polymerizable compound is slow, this process does not affect the pretilt angle that has been formed. Thus, the liquid crystal display device 10 can be obtained.

Example

In order to more clearly illustrate the present invention, the present invention will be further described below in conjunction with preferred embodiments. A person skilled in the art should understand that the following contents described in detail are illustrative rather than limiting, and should not limit the scope of protection of the present invention.

In the present invention, the preparation methods are all conventional methods unless otherwise specified, and the raw materials used are all available from open commercial approaches unless otherwise specified, the percentages all refer to mass percentages, the temperature is in degree Celsius (° C.), a liquid crystal compound is also referred to as a liquid crystal monomer, and the specific meanings of other symbols and the test conditions are as follows:

Cp represents the clearing point (° C.) of a liquid crystal as measured by means of a DSC quantitative method;

$\Delta n$ represents optical anisotropy, with $\Delta n = n_e - n_o$, wherein $n_o$ is the refractive index of an ordinary light, and $n_e$ is the refractive index of an extraordinary light, with the test conditions being: 25±2° C., 589 nm and using an abbe refractometer for testing;

$\Delta\varepsilon$ represents dielectric anisotropy, with $\Delta\varepsilon = \varepsilon// - \varepsilon\perp$, wherein $\varepsilon//$ is a dielectric constant parallel to a molecular axis, and $\varepsilon\perp$ is a dielectric constant perpendicular to the molecular axis, with the test conditions being 25±0.5° C., a 20 micron parallel cell, and INSTEC: ALCT-IR1 for testing;

γ1 represents a rotary viscosity (mPa·s), with the test conditions being 25±0.5° C., a 20 micron parallel cell, and INSTEC: ALCT-IR1 for testing; and τ represents response time (ms), with the test instrument being DMS-501 and the test condition being 25±0.5° C.

A method for preparing the liquid crystal composition involves: weighing various liquid crystal monomers at a certain ratio and then placing these monomers in a stainless steel beaker, placing the stainless steel beaker containing these liquid crystal monomers on a magnetic stirring instrument for heating melting, after the liquid crystal monomers in the stainless steel beaker are mostly melted, adding a magnetic rotor to the stainless steel beaker, uniformly stirring the mixture, and cooling the mixture to room temperature to obtain a liquid crystal composition.

In the embodiments of the present invention, liquid crystal monomer structures are represented by codes, wherein the codes of ring structures, end groups and linking groups of liquid crystals are represented, as shown in tables 1 and 2 below.

TABLE 1

Corresponding code of ring structure

| Ring structure | Corresponding code |
|---|---|
| 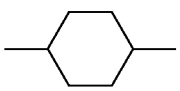 | C |
| 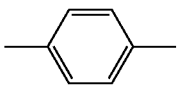 | P |
| 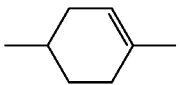 | L |
| 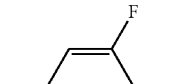 | G |
| 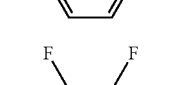 | Y |
| 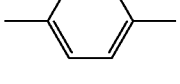 | Sa |
| 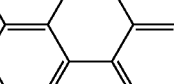 | Sb |
| 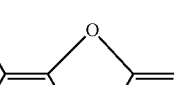 | Sc |

TABLE 2

Corresponding code for end group and linking group

| End group and linking group | Corresponding code |
|---|---|
| $C_nH_{2n+1}-$ | n- |
| $C_nH_{2n+1}O-$ | nO— |
| —$CH_2O$— | —O— |
| —F | —F |
| —CH═CH— | —V— |
| —CH═CH—$C_nH_{2n+1}$ | —Vn |
| 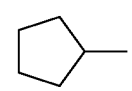 | Cp- |
| 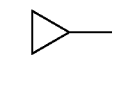 | Cpr- |
|  | Cpr1- |

EXAMPLES

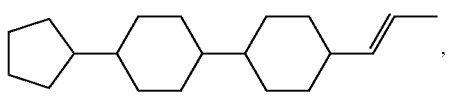

the code of which is CC-Cp-V1;

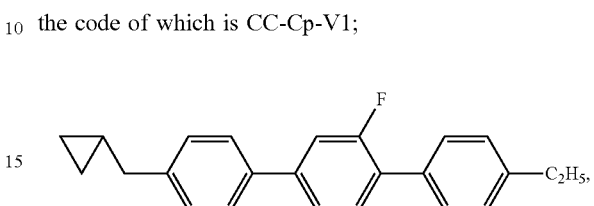

the code of which is PGP-Cpr1-2;

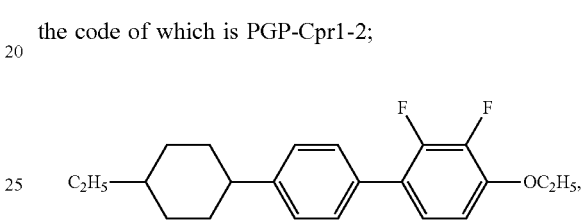

the code of which is CPY-2-O2;

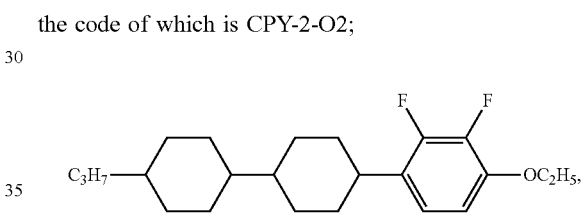

the code of which is CCY-3-O2;

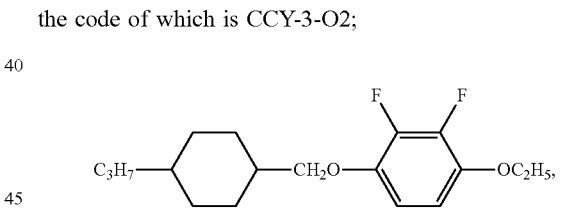

the code of which is COY-3-O2;

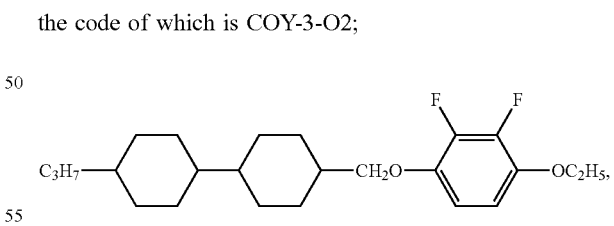

the code of which is CCOY-3-O2; and

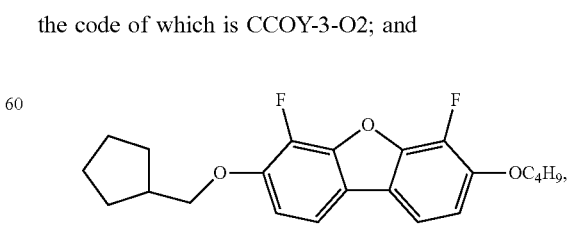

the code of which is Sb-Cp1O—O4; and

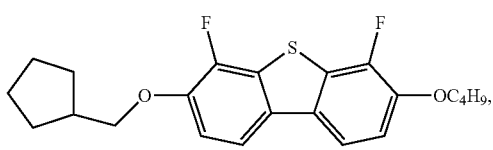

the code of which is Sc-Cp1O—O4.

Example 1

Preparation of a liquid crystal display device: firstly, a polyimide alignment material is uniformly applied to the surfaces of a first substrate and a second substrate, and is cured by means of heating at 230° C. to form an alignment layer with a thickness of 30 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. The spacers are glass beads with a diameter of 3.2 μm. Then, the first substrate and the second substrate are disposed opposite to each other and bonded to form a structure having a 3.2 μm interlayer space. Finally, the liquid crystal composition and the polymerizable compound in Table 3 are sealed between the first substrate and the second substrate, and a square wave alternating electric field with a voltage of 15V and a frequency of 60 Hz is applied to the liquid crystal display device while simultaneously performing a first stage of ultraviolet light irradiation (UV1) with a duration of 85 seconds (s), a wavelength of 365 nm, and an irradiance of 60 mW/cm$^2$, such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm$^2$, and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 3 below.

TABLE 3

| Category | Liquid crystal monomer code | Content (%) |
|---|---|---|
| I | CC-3-V | 10 |
| II | COY-3-O2 | 10 |
| II | COY-3-O1 | 10 |
| II | CCOY-2-O2 | 9 |
| II | CCY-3-O1 | 7 |
| II | CCY-3-O2 | 6 |
| II | CCY-4-O2 | 6 |
| II | CPY-5-O2 | 8 |
| II | CPY-3-O1Cpr | 10 |
| II | CPY-2-O2 | 10 |

TABLE 3-continued

| | Liquid crystal composition, polymerizable compound component, content and properties | |
|---|---|---|
| II | CY-3-O2 | 7 |
| II | CY-3-O4 | 7 |
| IV | IV1 | 0.5 |

Δε [1 KHz, 20° C.]: −5.9
ε$_\perp$ [1 KHz, 20° C.]: 10.6
Δn [589 nm, 20° C.]: 0.105
Cp: 86° C.
γ1: 181 mPa · s
τ: 8.1 ms Example 2

Preparation of a liquid crystal display device: firstly, a polyimide alignment material is uniformly applied to the surfaces of a first substrate and a second substrate, and is cured by means of heating at 230° C. to form an alignment layer with a thickness of 40 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. The spacers are plastic beads with a diameter of 3.0 μm. Then, the first substrate and the second substrate are disposed opposite to each other and bonded to form a structure having a 3.0 μm interlayer space. Finally, the liquid crystal composition and the polymerizable compound in Table 4 are sealed between the first substrate and the second substrate, and a square wave alternating electric field with a voltage of 15V and a frequency of 60 Hz is applied to the liquid crystal display device while simultaneously performing a first stage of ultraviolet light irradiation (UV1) with a duration of 85 seconds (s), a wavelength of 365 nm, and an irradiance of 60 mW/cm$^2$, such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm$^2$, and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 4 below.

TABLE 4

| Category | Liquid crystal monomer code | Content (%) |
|---|---|---|
| I | CC-3-V | 14 |
| I | CC-5-V | 6 |
| II | COY-Cp-O2 | 10 |
| II | COY-3-O1 | 5 |

TABLE 4-continued

Liquid crystal composition, polymerizable compound component, content and properties

| II | CCOY-2-O2 | 4 |
|---|---|---|
| II | CCY-3-O2 | 7 |
| II | CCY-4-O2 | 7 |
| II | CPY-5-O2 | 5 |
| II | CPY-2-O2 | 5 |
| II | CY-3-O2 | 7 |
| III | PP-5-O2 | 10 |
| III | PP-5-1 | 10 |
| III | PP-1-2V | 10 |
| IV | IV2 | 0.3 |

$\Delta\varepsilon$ [1 KHz, 20° C.]: −3.5
$\varepsilon_\perp$ [1 KHz, 20° C.]: 7.3
$\Delta n$ [589 nm, 20° C.]: 0.110
Cp: 75° C.
$\gamma 1$: 147 mPa·s
$\tau$: 8.4 ms

TABLE 5

Liquid crystal composition, polymerizable compound component, content and properties

| Category | Liquid crystal monomer code | Content (%) |
|---|---|---|
| I | CC-3-V | 20 |
| I | CC-5-V | 10 |
| II | COY-Cp-O2 | 10 |
| II | CCOY-2-O2 | 4 |
| II | CCY-3-O2 | 7 |
| II | CCY-4-O2 | 7 |
| II | CPY-5-O2 | 5 |
| II | CPY-2-O2 | 5 |
| II | CY-3-O2 | 2 |
| V | CC-4-3 | 10 |
| V | CC-2-3 | 10 |
| V | CP-3-O2 | 10 |
| IV | IV3 | 0.1 |

$\Delta\varepsilon$ [1 KHz, 20° C.]: −2.8
$\varepsilon_\perp$ [1 KHz, 20° C.]: 5.7
$\Delta n$ [589 nm, 20° C.]: 0.070
Cp: 75° C.
$\gamma 1$: 95 mPa·s
$\tau$: 7.8 ms Example 3

Preparation of a liquid crystal display device: firstly, a polyimide alignment material is uniformly applied to the surfaces of a first substrate and a second substrate, and is cured by means of heating at 230° C. to form an alignment layer with a thickness of 60 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. The spacers are glass beads with a diameter of 2.6 µm. Then, the first substrate and the second substrate are disposed opposite to each other and bonded to form a structure having a 2.6 µm interlayer space. Finally, the liquid crystal composition and the polymerizable compound in Table 5 are sealed between the first substrate and the second substrate, and a square wave alternating electric field with a voltage of 15V and a frequency of 60 Hz is applied to the liquid crystal display device while simultaneously performing a first stage of ultraviolet light irradiation (UV1) with a duration of 85 seconds (s), a wavelength of 365 nm, and an irradiance of 60 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 5 below.

Example 4

Preparation of a liquid crystal display device: firstly, a polyimide alignment material is uniformly applied to the surfaces of a first substrate and a second substrate, and is cured by means of heating at 230° C. to form an alignment layer with a thickness of 80 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. The spacers are glass beads with a diameter of 2.7 µm. Then, the first substrate and the second substrate are disposed opposite to each other and bonded to form a structure having a 2.7 µm interlayer space. Finally, the liquid crystal composition and the polymerizable compound in Table 6 are sealed between the first substrate and the second substrate, and a square wave alternating electric field with a voltage of 15V and a frequency of 60 Hz is applied to the liquid crystal display device while simultaneously performing a first stage of ultraviolet light irradiation (UV1) with a duration of 85 seconds (s), a wavelength of 365 nm, and an irradiance of 60 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 6 below.

TABLE 6

Liquid crystal composition, polymerizable
compound component, content and properties

| Category | Liquid crystal monomer code | Content (%) |
|---|---|---|
| I | CC-3-V | 30 |
| I | CC-5-V | 10 |
| II | COY-Cp-O2 | 10 |
| II | CCOY-2-O2 | 4 |
| II | CCY-3-O2 | 7 |
| II | CCY-4-O2 | 7 |
| II | CPY-5-O2 | 5 |
| II | CPY-2-O2 | 5 |
| II | CY-3-O2 | 2 |
| VI | Sb-2O-O5 | 10 |
| VI | Sc-2O-O4 | 10 |
| IV | IV4 | 0.05 |

$\Delta\varepsilon$ [1 KHz, 20° C.]: −5.1
$\varepsilon_\perp$ [1 KHz, 20° C.]: 9.3
$\Delta n$ [589 nm, 20° C.]: 0.100
Cp: 71° C.
γ1: 123 mPa · s
τ: 8.0 ms

TABLE 7

Liquid crystal composition, polymerizable
compound component, content and properties

| Category | Liquid crystal monomer code | Content (%) |
|---|---|---|
| I | CC-3-V | 21 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| VII | CPP-3-2 | 10 |
| VII | CPP-5-2 | 10 |
| IV | IV5 | 0.03 |

$\Delta\varepsilon$ [1 KHz, 20° C.]: −4.8
$\varepsilon_\perp$ [1 KHz, 20° C.]: 7.5
$\Delta n$ [589 nm, 20° C.]: 0.109
Cp: 74° C.
γ1: 136 mPa · s
τ: 7.9 ms Example 5

Preparation of a liquid crystal display device: firstly, a polyimide alignment material is uniformly applied to the surfaces of a first substrate and a second substrate, and is cured by means of heating at 230° C. to form an alignment layer with a thickness of 60 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. The spacers are plastic beads with a diameter of 2.8 μm. Then, the first substrate and the second substrate are disposed opposite to each other and bonded to form a structure having a 2.8 μm interlayer space. Finally, the liquid crystal composition and the polymerizable compound in Table 7 are sealed between the first substrate and the second substrate, and a square wave alternating electric field with a voltage of 15V and a frequency of 60 Hz is applied to the liquid crystal display device while simultaneously performing a first stage of ultraviolet light irradiation (UV1) with a duration of 85 seconds (s), a wavelength of 365 nm, and an irradiance of 60 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 7 below.

Example 6

Preparation of a liquid crystal display device: firstly, a polyimide alignment material is uniformly applied to the surfaces of a first substrate and a second substrate, and is cured by means of heating at 230° C. to form an alignment layer with a thickness of 120 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. The spacers are plastic beads with a diameter of 2.5 μm. Then, the first substrate and the second substrate are disposed opposite to each other and bonded to form a structure having a 2.5 μm interlayer space. Finally, the liquid crystal composition and the polymerizable compound in Table 8 are sealed between the first substrate and the second substrate, and a square wave alternating electric field with a voltage of 15V and a frequency of 60 Hz is applied to the liquid crystal display device while simultaneously performing a first stage of ultraviolet light irradiation (UV1) with a duration of 85 seconds (s), a wavelength of 365 nm, and an irradiance of 60 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 8 below.

TABLE 8

Liquid crystal composition, polymerizable
compound component, content and properties

| Category | Liquid crystal monomer code | Content (%) |
|---|---|---|
| I | CC-3-V | 21 |
| I | CC-4-V | 6.5 |
| II | PY-3-O2 | 2.5 |
| II | COY-3-O2 | 8 |
| II | COY-3-O1 | 7 |
| II | CCOY-2-O2 | 9 |
| II | CPY-5-O2 | 3 |
| II | CPY-3-O2 | 10 |
| II | CPY-2-O2 | 10 |
| II | CCY-3-O2 | 4 |
| II | CCY-5-O2 | 4 |
| II | CY-3-O4 | 5 |
| II | CY-3-O2 | 5 |
| VIII | CPPC-3-3 | 3 |
| VIII | CGPC-3-3 | 2 |
| IV | IV6 | 0.01 |

$\Delta\varepsilon$ [1 KHz, 20° C.]: −5.7
$\varepsilon_\perp$ [1 KHz, 20° C.]: 9.5
$\Delta n$ [589 nm, 20° C.]: 0.101
Cp: 89° C.
$\gamma 1$: 153 mPa·s
$\tau$: 7.6 ms Example 7

The same liquid crystal display device preparation process as in Example 1 is employed, except that the liquid crystal composition and the polymerizable compound in Table 9 are sealed between the first substrate and the second substrate, to obtain a liquid crystal display device of Example 7.

The liquid crystal composition of the liquid crystal display device, the polymerizable compound component, the content thereof and the corresponding properties thereof are as shown in Table 9 below.

TABLE 9

Liquid crystal composition, polymerizable
compound component, content and properties

| Category | Liquid crystal monomer code | Content (%) |
|---|---|---|
| I | CC-3-V | 14 |
| I | CC-5-V | 6 |
| II | COY-Cp-O2 | 10 |
| II | COY-3-O1 | 5 |
| II | CCOY-2-O2 | 4 |
| II | CCY-3-O2 | 7 |
| II | CCY-4-O2 | 7 |
| II | CPY-5-O2 | 5 |
| II | CPY-2-O2 | 5 |
| II | CY-3-O2 | 7 |
| III | PP-5-O2 | 10 |
| V | CC-4-3 | 10 |
| V | CP-3-O2 | 10 |
| IV | IV7 | 0.3 |

$\Delta\varepsilon$ [1 KHz, 20° C.]: −3.4
$\varepsilon_\perp$ [1 KHz, 20° C.]: 7.2
$\Delta n$ [589 nm, 20° C.]: 0.092
Cp: 70° C.
$\gamma 1$: 133 mPa·s
$\tau$: 8.2 ms Example 8

The same liquid crystal display device preparation process as in Example 1 is employed, except that the liquid crystal composition and the polymerizable compound in Table 10 are sealed between the first substrate and the second substrate, to obtain a liquid crystal display device of Example 8.

The liquid crystal composition of the liquid crystal display device, the polymerizable compound component, the content thereof and the corresponding properties thereof are as shown in Table 10 below.

TABLE 10

Liquid crystal composition, polymerizable
compound component, content and properties

| Category | Liquid crystal monomer code | Content (%) |
|---|---|---|
| I | CC-3-V | 14 |
| I | CC-5-V | 11 |
| II | COY-Cp-O2 | 10 |
| II | COY-3-O1 | 5 |
| II | CCOY-2-O2 | 4 |
| II | CCY-3-O2 | 7 |
| II | CCY-4-O2 | 7 |
| II | CPY-5-O2 | 5 |
| II | CPY-2-O2 | 5 |
| II | CY-3-O2 | 7 |
| III | PP-5-O2 | 8 |
| III | PP-5-1 | 7 |
| VI | Sb-2O-O5 | 10 |
| IV | IV8 | 0.4 |

$\Delta\varepsilon$ [1 KHz, 20° C.]: −4.7
$\varepsilon_\perp$ [1 KHz, 20° C.]: 9.1
$\Delta n$ [589 nm, 20° C.]: 0.106
Cp: 65° C.
$\gamma 1$: 140 mPa·s
$\tau$: 8.9 ms Example 9

The same liquid crystal display device preparation process as in Example 3 is employed, except that the liquid crystal composition and the polymerizable compound in Table 11 are sealed between the first substrate and the second substrate, to obtain a liquid crystal display device of Example 9.

The liquid crystal composition of the liquid crystal display device, the polymerizable compound component, the content thereof and the corresponding properties thereof are as shown in Table 11 below.

TABLE 11

Liquid crystal composition, polymerizable
compound component, content and properties

| Category | Liquid crystal monomer code | Content (%) |
|---|---|---|
| I | CC-3-V | 30 |
| I | CC-5-V | 10 |
| II | COY-Cp-O2 | 10 |
| II | CCOY-2-O2 | 4 |
| II | CCY-3-O2 | 7 |
| II | CCY-4-O2 | 7 |
| II | CPY-5-O2 | 10 |
| II | CPY-2-O2 | 5 |
| II | CY-3-O2 | 2 |
| V | CC-4-3 | 10 |
| VI | Sb-Cp1O-O5 | 3 |
| VI | Sc-2O-O4 | 2 |
| IV | IV3 | 0.2 |

$\Delta\varepsilon$ [1 KHz, 20° C.]: −3.5
$\varepsilon_\perp$ [1 KHz, 20° C.]: 6.9
$\Delta n$ [589 nm, 20° C.]: 0.085
Cp: 80° C.
$\gamma 1$: 124 mPa·s
$\tau$: 8.9 ms

Example 10

The same liquid crystal display device preparation process as in Example 5 is employed, except that the liquid crystal composition and the polymerizable compound in Table 12 are sealed between the first substrate and the second substrate, to obtain a liquid crystal display device of Example 10.

The liquid crystal composition of the liquid crystal display device, the polymerizable compound component, the content thereof and the corresponding properties thereof are as shown in Table 12 below.

TABLE 12

Liquid crystal composition, polymerizable compound component, content and properties

| Category | Liquid crystal monomer code | Content (%) |
|---|---|---|
| I | CC-3-V | 21 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| VII | CPP-3-2 | 5 |
| VII | CPP-5-2 | 5 |
| VII | PGP-Cpr1-1 | 2 |
| IV | IV3 | 0.03 |

$\Delta\varepsilon$ [1 KHz, 20° C.]: −4.9
$\varepsilon_\perp$ [1 KHz, 20° C.]: 7.8
$\Delta n$ [589 nm, 20° C.]: 0.113
Cp: 79° C.
$\gamma 1$: 147 mPa · s
$\tau$: 8.8 ms

Example 11

The same liquid crystal display device preparation process as in Example 5 is employed, except that the liquid crystal composition and the polymerizable compound in Table 13 are sealed between the first substrate and the second substrate, to obtain a liquid crystal display device of Example 11.

The liquid crystal composition of the liquid crystal display device, the polymerizable compound component, the content thereof and the corresponding properties thereof are as shown in Table 13 below.

TABLE 13

Liquid crystal composition, polymerizable compound component, content and properties

| Category | Liquid crystal monomer code | Content (%) |
|---|---|---|
| I | CC-3-V | 21 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| V | CC-2-3 | 5 |
| VII | CPP-3-2 | 8 |
| VII | CPP-5-2 | 7 |
| IV | IV6 | 0.05 |

$\Delta\varepsilon$ [1 KHz, 20° C.]: −4.5
$\varepsilon_\perp$ [1 KHz, 20° C.]: 7.2
$\Delta n$ [589 nm, 20° C.]: 0.103
Cp: 70° C.
$\gamma 1$: 152 mPa · s
$\tau$: 7.6 ms

Example 12

The same liquid crystal display device preparation process as in Example 5 is employed, except that the liquid crystal composition and the polymerizable compound in Table 14 are sealed between the first substrate and the second substrate, to obtain a liquid crystal display device of Example 12.

The liquid crystal composition of the liquid crystal display device, the polymerizable compound component, the content thereof and the corresponding properties thereof are as shown in Table 14 below.

TABLE 14

Liquid crystal composition, polymerizable compound component, content and properties

| Category | Liquid crystal monomer code | Content (%) |
|---|---|---|
| I | CC-3-V | 21 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| VI | Sb-2O-O5 | 5 |
| VII | CPP-3-2 | 8 |
| VII | CPP-5-2 | 7 |
| IV | IV1 | 0.03 |

$\Delta\varepsilon$ [1 KHz, 20° C.]: −5.6
$\varepsilon_\perp$ [1 KHz, 20° C.]: 9.2
$\Delta n$ [589 nm, 20° C.]: 0.105
Cp: 76° C.
$\gamma 1$: 149 mPa · s
$\tau$: 8.4 ms

Example 13

The same liquid crystal display device preparation process as in Example 5 is employed, except that the liquid crystal composition and the polymerizable compound in Table 15 are sealed between the first substrate and the second substrate, to obtain a liquid crystal display device of Example 13.

The liquid crystal composition of the liquid crystal display device, the polymerizable compound component, the content thereof and the corresponding properties thereof are as shown in Table 15 below.

TABLE 15

Liquid crystal composition, polymerizable compound component, content and properties

| Category | Liquid crystal monomer code | Content (%) |
|---|---|---|
| I | CC-3-V | 20 |
| I | CC-4-V | 10 |

TABLE 15-continued

Liquid crystal composition, polymerizable compound component, content and properties

| | | |
|---|---|---|
| I | CC-5-V | 10 |
| II | CY-3-O2 | 11 |
| II | COY-3-O2 | 14 |
| II | COY-3-O1 | 4 |
| II | CCOY-2-O2 | 5 |
| II | CPY-5-O2 | 3 |
| II | CPY-3-O2 | 8 |
| VII | CCP-3-1 | 5 |
| VII | CPP-3-2V1 | 4 |
| VII | CPP-1V-2 | 4 |
| VIII | CGPC-3-3 | 2 |
| IV | IV6 | 0.8 |

$\Delta\varepsilon$ [1 KHz, 20° C.]: −3.1
$\varepsilon_\perp$ [1 KHz, 20° C.]: 6.1
$\Delta$n [589 nm, 20° C.]: 0.094
Cp: 67° C.
γ1: 155 mPa · s
τ: 8.0 ms

Example 14

The same liquid crystal display device preparation process as in Example 5 is employed, except that the liquid crystal composition and the polymerizable compound in Table 16 are sealed between the first substrate and the second substrate, to obtain a liquid crystal display device of Example 14.

The liquid crystal composition of the liquid crystal display device, the polymerizable compound component, the content thereof and the corresponding properties thereof are as shown in Table 16 below.

TABLE 16

Liquid crystal composition, polymerizable compound component, content and properties

| Category | Liquid crystal monomer code | Content (%) |
|---|---|---|
| I | CC-3-V | 11 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| V | CC-2-3 | 10 |
| VII | CPP-3-2 | 5 |
| VII | CPP-5-2 | 5 |
| VII | PGP-Cpr1-1 | 2 |
| IV | IV3 | 0.06 |

$\Delta\varepsilon$ [1 KHz, 20° C.]: −4.8
$\varepsilon_\perp$ [1 KHz, 20° C.]: 7.7
$\Delta$n [589 nm, 20° C.]: 0.115
Cp: 81° C.
γ1: 168 mPa · s
τ: 9.0 ms

Example 15

The same liquid crystal display device preparation process as in Example 5 is employed, except that the liquid crystal composition and the polymerizable compound in Table 17 are sealed between the first substrate and the second substrate, to obtain a liquid crystal display device of Example 15.

The liquid crystal composition of the liquid crystal display device, the polymerizable compound component, the content thereof and the corresponding properties thereof are as shown in Table 17 below.

TABLE 17

Liquid crystal composition, polymerizable compound component, content and properties

| Category | Liquid crystal monomer code | Content (%) |
|---|---|---|
| I | CC-3-V | 11 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| VI | Sb-2O-O5 | 5 |
| VI | Sb-Cpr1O-O5 | 3 |
| VI | Sc-Cp1O-O4 | 2 |
| VII | CPP-3-2 | 5 |
| VII | CPP-5-2 | 5 |
| VII | PGP-Cpr1-1 | 2 |
| IV | IV3 | 0.06 |

$\Delta\varepsilon$ [1 KHz, 20° C.]: −6.3
$\varepsilon_\perp$ [1 KHz, 20° C.]: 10.4
$\Delta$n [589 nm, 20° C.]: 0.120
Cp: 86° C.
γ1: 166 mPa · s
τ: 9.5 ms

Example 16

The same liquid crystal display device preparation process as in Example 4 is employed, except that the liquid crystal composition and the polymerizable compound in Table 18 are sealed between the first substrate and the second substrate, to obtain a liquid crystal display device of Example 16.

The liquid crystal composition of the liquid crystal display device, the polymerizable compound component, the content thereof and the corresponding properties thereof are as shown in Table 18 below.

TABLE 18

Liquid crystal composition, polymerizable compound component, content and properties

| Category | Liquid crystal monomer code | Content (%) |
|---|---|---|
| I | CC-3-V | 16 |
| I | CC-4-V | 6.5 |
| II | CY-3-O2 | 5.5 |
| II | COY-3-O2 | 12 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| VII | CPP-3-2 | 5 |
| VII | CPP-5-2 | 5 |
| VIII | CPPC-3-3 | 2 |
| IV | IV3 | 0.07 |

$\Delta\varepsilon$ [1 KHz, 20° C.]: −5.1
$\varepsilon_\perp$ [1 KHz, 20° C.]: 7.9
$\Delta$n [589 nm, 20° C.]: 0.125
Cp: 87° C.
γ1: 158 mPa · s
τ: 9.6 ms

Example 17

The same liquid crystal display device preparation process as in Example 5 is employed, except that the liquid crystal composition and the polymerizable compound in Table 19 are sealed between the first substrate and the second substrate, to obtain a liquid crystal display device of Example 17.

The liquid crystal composition of the liquid crystal display device, the polymerizable compound component, the content thereof and the corresponding properties thereof are as shown in Table 19 below.

TABLE 19

Liquid crystal composition, polymerizable compound component, content and properties

| Category | Liquid crystal monomer code | Content (%) |
|---|---|---|
| I | CC-3-V | 11 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| V | CC-2-3 | 5 |
| VI | Sb-2O-O5 | 5 |
| VII | CPP-3-2 | 5 |
| VII | CPP-5-2 | 5 |
| VII | PGP-2-3 | 2 |
| IV | IV1 | 0.3 |

$\Delta\varepsilon$ [1 KHz, 20° C.]: −5.1
$\varepsilon_\perp$ [1 KHz, 20° C.]: 8.4
$\Delta n$ [589 nm, 20° C.]: 0.116
Cp: 81° C.
$\gamma1$: 152 mPa · s
$\tau$: 9.2 ms Example 18

The same liquid crystal display device preparation process as in Example 5 is employed, except that the liquid crystal composition and the polymerizable compound in Table 20 are sealed between the first substrate and the second substrate, to obtain a liquid crystal display device of Example 18.

The liquid crystal composition of the liquid crystal display device, the polymerizable compound component, the content thereof and the corresponding properties thereof are as shown in Table 20 below.

TABLE 20

Liquid crystal composition, polymerizable compound component, content and properties

| Category | Liquid crystal monomer code | Content (%) |
|---|---|---|
| I | CC-3-V | 11 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| V | CC-2-3 | 10 |
| VII | CPP-3-2 | 5 |
| VII | CPP-5-2 | 5 |
| VIII | CPPC-3-3 | 2 |
| IV | IV6 | 0.5 |

TABLE 20-continued

Liquid crystal composition, polymerizable compound component, content and properties $\Delta\varepsilon$ [1 KHz, 20° C.]: −4.9
$\varepsilon_\perp$ [1 KHz, 20° C.]: 7.9
$\Delta n$ [589 nm, 20° C.]: 0.116
Cp: 82° C.
$\gamma1$: 177 mPa · s
$\tau$: 9.1 ms Example 19

The same liquid crystal display device preparation process as in Example 5 is employed, except that the liquid crystal composition and the polymerizable compound in Table 21 are sealed between the first substrate and the second substrate, to obtain a liquid crystal display device of Example 19.

The liquid crystal composition of the liquid crystal display device, the polymerizable compound component, the content thereof and the corresponding properties thereof are as shown in Table 21 below.

TABLE 21

Liquid crystal composition, polymerizable compound component, content and properties

| Category | Liquid crystal monomer code | Content (%) |
|---|---|---|
| I | CC-3-V | 11 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| V | CC-2-3 | 5 |
| VI | Sb-2O-O5 | 5 |
| VII | CPP-3-2 | 5 |
| VII | CPP-5-2 | 5 |
| VIII | CPPC-3-3 | 2 |
| IV | IV3 | 0.03 |

$\Delta\varepsilon$ [1 KHz, 20° C.]: −5.1
$\varepsilon_\perp$ [1 KHz, 20° C.]: 8.4
$\Delta n$ [589 nm, 20° C.]: 0.116
Cp: 82° C.
$\gamma1$: 162 mPa · s
$\tau$: 9.5 ms Comparative Example 1

Preparation of a liquid crystal display device: firstly, a polyimide alignment material is uniformly applied to the surfaces of a first substrate and a second substrate, and is cured by means of heating at 230° C. to form an alignment layer with a thickness of 60 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. The spacers are plastic beads with a diameter of 3.5 μm. Then, the first substrate and the second substrate are disposed opposite to each other and bonded to form a structure having a 3.5 μm interlayer space. Finally, the liquid crystal composition and the polymerizable compound in Table 16 are sealed between the first substrate and the second substrate, and a square wave alternating electric field with a voltage of 15V and a frequency of 60 Hz is applied to the liquid crystal display device while simultaneously performing a first stage of ultraviolet light irradiation (UV1) with a duration of 85 seconds (s), a wavelength of 365 nm, and an irradiance of 60 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The corresponding properties of the liquid crystal display device of Comparative Example 1 are as follows.

Δε [1 KHz, 20° C.]: −4.8
ε⊥ [1 KHz, 20° C.]: 7.7
Δn [589 nm, 20° C.]: 0.115
Cp: 81° C.
γ1: 168 mPa · s
τ: 9.9 ms

Comparing Comparative Example 1 with Example 14, the compositions of the liquid crystal composition and the polymerizable compound component and the contents thereof are the same; by changing the diameter of the spacers, a liquid crystal display device having a distance between the first substrate and the second substrate of 3.5 μm is obtained, thereby causing the response speed of the liquid crystal display device of Comparative Example 1 to be significantly slower than this example.

The invention claimed is:
1. A liquid crystal display device, comprising:
a first substrate;
a second substrate; and
a liquid crystal composition disposed between said first substrate and said second substrate,
wherein said first substrate and said second substrate are disposed in parallel and opposite to each other, with a distance between said first substrate and said second substrate being 2.5 μm to 3.2 μm;
two alignment layers are independently disposed on a side of said first and second substrates that faces to said liquid crystal composition;
said alignment layers are provided with vertical alignment films that allow liquid crystal molecules in said liquid crystal composition to be arranged roughly perpendicular to said first or second substrate; and
said liquid crystal composition comprises one or more compounds represented by formula I below, one or more compounds represented by formula II below, and one or more compounds represented by formula VI below:

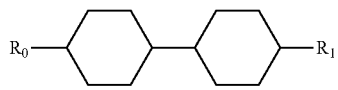

I

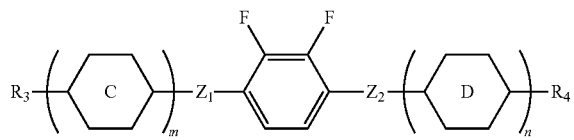

II

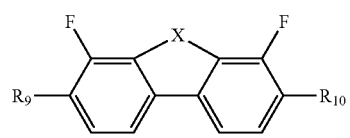

VI wherein $R_0$ represents an alkyl group having a carbon atom number of 1-10, an alkoxy group having a carbon atom number of 1-10, an alkenyl group having a carbon atom number of 2-10, or an alkenoxy group having a carbon atom number of 3-8, and $R_1$ represents an alkenyl group having a carbon atom number of 2-10; and wherein $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —$CH_2$— in the groups represented by $R_3$ and $R_4$ are each independently optionally substituted with cyclopentylene, cyclobutylene or cyclopropylene;

wherein $R_9$ and $R_{10}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —$CH_2$— groups in the groups represented by $R_9$ and $R_{10}$ are each independently optionally substituted with cyclopentylene, cyclobutylene or cyclopropylene;

X represents O, S or —$CH_2O$—;
$Z_1$ and $Z_2$ each independently represent a single bond, —$CH_2CH_2$— or —$CH_2O$—;

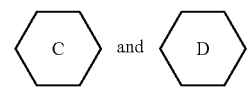

each independently represent 1,4-phenylene, 1,4-cyclohexylene, fluorinated 1,4-phenylene or 1,4-cyclohexenylene;
m represents 1 or 2; and
n represents 0, 1 or 2.

2. The liquid crystal display device according to claim 1, wherein said first substrate is a color film substrate, and said second substrate is a thin film transistor substrate; and said first substrate is provided with a common electrode, and said second substrate is provided with a pixel electrode.

3. The liquid crystal display device according to claim 1, wherein said alignment layers have a thickness of 30 nm to 120 nm.

4. The liquid crystal display device according to claim 1, wherein the distance between said first substrate and said second substrate is 2.6 μm to 3.0 μm.

5. The liquid crystal display device according to claim 1, wherein said vertical alignment films are thin films formed by polymerizing a polymerizable compound having a polymerizable group.

6. The liquid crystal display device according to claim 5, wherein said polymerizable compound is selected from one or more compounds represented by formula IV:

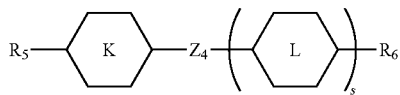
IV wherein $R_5$ and $R_6$ each independently represent $P_3$—$Sp_3$-, H, Cl, F, or an alkyl having a carbon atom number of 1-12; one or more non-neighboring —$CH_2$— groups in said alkyl having a carbon atom number of 1-12 is optionally replaced by —O—, —$CH_2$=$CH_2$—, —CO—, —OCO— or —COO—; wherein at least one of $R_5$ and $R_6$ represents $P_3$-$Sp_3$-;

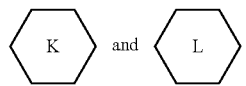

each independently represent phenylene, a phenylene group optionally substituted with $P_3$—$Sp_3$-, Cl, F, an alkyl having a carbon atom number of 1-12 or an alkoxy group having a carbon atom number of 1-12, or indanyl, wherein one or two non-neighboring —$CH_2$— groups in said alkyl having a carbon atom number of 1-12 and said alkoxy group having a carbon atom number of 1-12 are optionally replaced by —O—, —$CH_2$=$CH_2$—, —CO—, —OCO— or —COO—; furthermore,

is bonded to $R_5$ at any position of

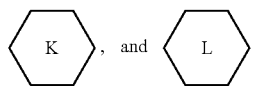

is bonded to $R_6$ at any position of

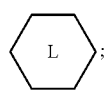
;

s represents 0, 1 or 2;
$P_3$ represents a polymerizable group; $Sp_3$ represents a spacer group; and
$Z_4$ represents a single bond, —COO—, —$CH_2$O— or —$CH_2CH_2$—.

7. The liquid crystal display device according to claim 1, wherein said liquid crystal composition further comprises one or more compounds represented by formula III:

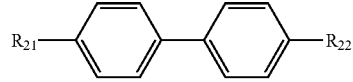
III wherein $R_{21}$ and $R_{22}$ each independently represent an alkyl group having a carbon atom number of 1-10, an alkoxy group having a carbon atom number of 1-10, an alkenyl group having a carbon atom number of 2-10, or an alkenoxy group having a carbon atom number of 3-8.

8. The liquid crystal display device according to claim 1, wherein said liquid crystal composition further comprises one or more compounds represented by formula V:

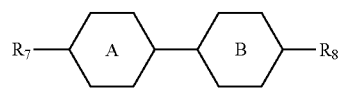
V wherein $R_7$ and $R_8$ each independently represent an alkyl group having a carbon atom number of 1-10, an alkoxy group having a carbon atom number of 1-10, an alkenyl group having a carbon atom number of 2-10, or an alkenoxy group having a carbon atom number of 3-8;

represents

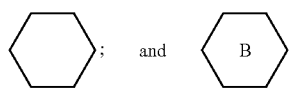
; and represents

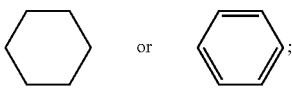 [SMILES: C1CCCCC1 ; "or" ; c1ccccc1 ; ";"]
or
;

where

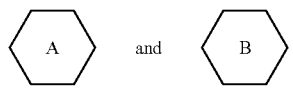

both represent

, $R_8$ does not represent an alkenyl group.

9. The liquid crystal display device according to claim 1, wherein said liquid crystal composition further comprises one or more compounds represented by formula VII:

wherein $R_{11}$ and $R_{12}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —CH$_2$— groups in the groups represented by Ru and $R_{12}$ are each independently optionally substituted with cyclopentylene, cyclobutylene or cyclopropylene;

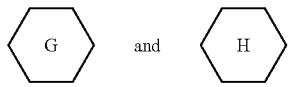

each independently represent

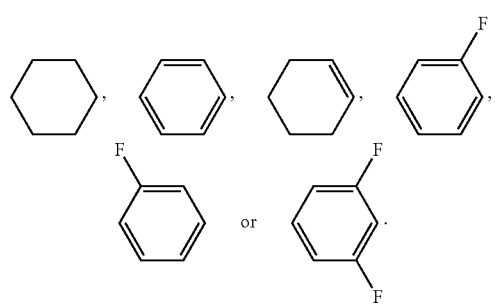

10. The liquid crystal display device according to claim 1, wherein said liquid crystal composition further comprises one or more compounds represented by formula VIII:

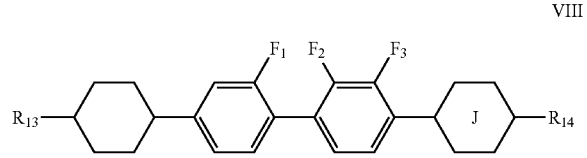

wherein $R_{13}$ and $R_{14}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8:

represents

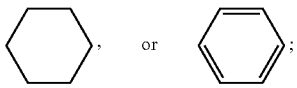 [SMILES: C1CCCCC1 ; "," ; "or" ; c1ccccc1 ; ";"]

and $F_1$, $F_2$ and $F_3$ each independently represent H or F, with $F_2$ and $F_3$ not simultaneously being F.

* * * * *